(12) United States Patent
Grocutt

(10) Patent No.: US 10,628,155 B2
(45) Date of Patent: Apr. 21, 2020

(54) COMPLEX MULTIPLY INSTRUCTION

(71) Applicant: ARM LIMITED, Cambridge (GB)

(72) Inventor: Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 49 days.

(21) Appl. No.: 16/081,147

(22) PCT Filed: Feb. 22, 2017

(86) PCT No.: PCT/GB2017/050443
§ 371 (c)(1),
(2) Date: Aug. 30, 2018

(87) PCT Pub. No.: WO2017/168118
PCT Pub. Date: Oct. 5, 2017

(65) Prior Publication Data
US 2019/0310847 A1    Oct. 10, 2019

(30) Foreign Application Priority Data

Apr. 1, 2016 (GB) .................................. 1605557.6

(51) Int. Cl.
*G06F 9/30* (2018.01)
(52) U.S. Cl.
CPC ........ *G06F 9/3001* (2013.01); *G06F 9/30036* (2013.01); *G06F 9/30145* (2013.01)
(58) Field of Classification Search
None
See application file for complete search history.

(56) References Cited

U.S. PATENT DOCUMENTS

| 7,392,368 | B2 * | 6/2008 | Khan | G06F 9/30014 |
| | | | | 712/22 |
| 8,200,945 | B2 * | 6/2012 | Chatterjee | G06F 9/30014 |
| | | | | 712/218 |

(Continued)

FOREIGN PATENT DOCUMENTS

| EP | 2 851 786 | 3/2015 |
| WO | 2002/37259 | 5/2002 |

OTHER PUBLICATIONS

International Search Report and Written Opinion of the ISA for PCT/GB2017/050443, dated May 23, 2017, 11 pages.

(Continued)

*Primary Examiner* — Corey S Faherty
(74) *Attorney, Agent, or Firm* — Nixon & Vanderhye P.C.

(57) ABSTRACT

First and second forms of a complex multiply instruction are provided for operating on first and second operand vectors comprising multiple data elements including at least one real data element for representing the real part of a complex number and at least one imaginary element for representing an imaginary part of the complex number. One of the first and second forms of the instruction targets at least one real element of the destination vector and the other targets at least one imaginary element. By executing one of each instruction, complex multiplications of the form (a+ib)*(c+id) can be calculated using relatively few instructions and with only two vector register read ports, enabling DSP algorithms such as FFTs to be calculated more efficiently using relatively low power hardware implementations.

20 Claims, 12 Drawing Sheets

(56) References Cited

U.S. PATENT DOCUMENTS

| | | | |
|---|---|---|---|
| 8,423,979 B2 * | 4/2013 | Archambault | G06F 8/445 717/140 |
| 2005/0097299 A1 * | 5/2005 | Dockser | G06F 9/3001 712/2 |
| 2005/0193185 A1 | 9/2005 | Taunton et al. | |
| 2006/0015702 A1 | 1/2006 | Khan et al. | |
| 2009/0055455 A1 | 2/2009 | Matsuyama et al. | |
| 2012/0173600 A1 | 7/2012 | Park et al. | |

OTHER PUBLICATIONS

Combined Search and Examination Report for GB 160557.6, dated Sep. 14, 2016, 7 pages.

* cited by examiner $$r = (a - ib)(c + id)$$
$$= ac - ibc + iad + bd$$
$$= \underbrace{(ac + bd)} + i\underbrace{(ad - bc)}$$
$$\text{2 instructions}$$

$$r = -i(a + ib)(c + id)$$
$$= -i(ac - bd + i(ad + bc))$$
$$= ad + bc + i(bd - ac)$$

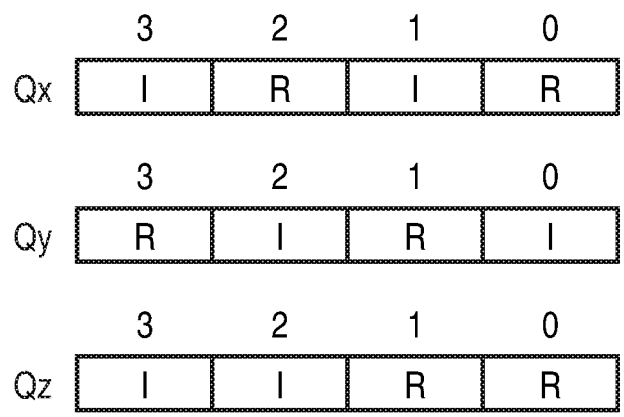
FIG. 6
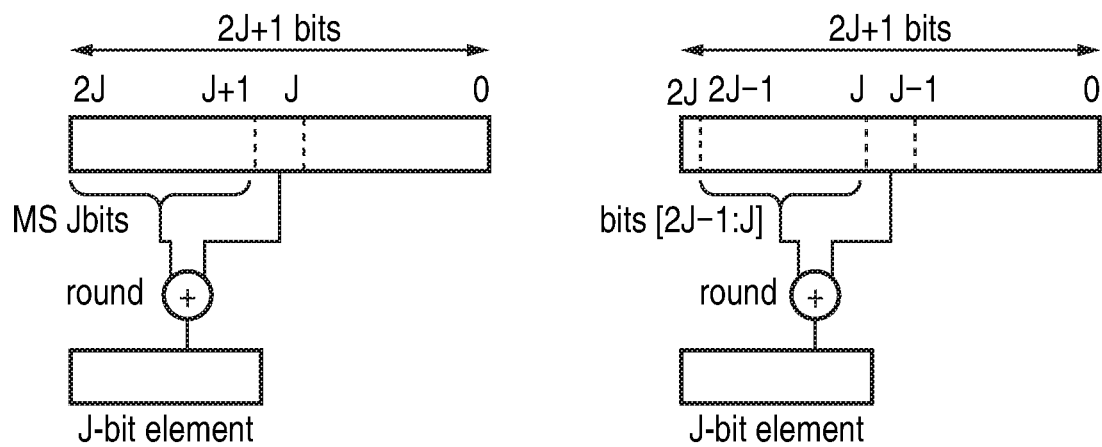
FIG. 7
FIG. 8

COMPLEX MULTIPLY INSTRUCTION

This application is the U.S. national phase of International Application No. PCT/GB2017/050443 filed Feb. 22, 2017, which designated the U.S. and claims priority to GB Patent Application No. 1605557.6 filed Apr. 1, 2016, the entire contents of each of which are hereby incorporated by reference.

The present technique relates to the technical field of data processing.

Some data processing applications involve processing of complex numbers having a real part and an imaginary part, i.e., numbers of the form a+ib, where i represents the square root of −1 (sometimes the square root of −1 can also be represented by 'j', but we will use 'i' herein). Complex arithmetic can be particularly useful for digital signal processing (DSP) applications, for example for calculating Fast Fourier Transforms (FFT). Some DSP algorithms can require many multiplications of the form r=(a+ib)*(c+id), so the way in which complex multiplications are handled by the processor can be a factor which affects performance.

At least some examples provide a data processing apparatus comprising:

processing circuitry to perform data processing; and an instruction decoder to decode instructions to control the processing circuitry to perform the data processing;

wherein the instruction decoder is configured to decode a complex multiply instruction to control the processing circuitry to perform a partial complex multiply operation on first and second operand vectors to set at least one target element of a destination vector to a value dependent on a result of adding or subtracting a first product and a second product, the first and second operand vectors and the destination vector each comprising a plurality of data elements including at least one real element for representing a real part of a complex number and at least one imaginary element for representing an imaginary part of a complex number;

in response to a first form of the complex multiply instruction, the instruction decoder is configured to control the processing circuitry to perform the partial complex multiply operation with the first product comprising a product of a real element of the first operand vector and a corresponding real element of the second operand vector, and the second product comprising a product of an imaginary element of the first operand vector and a corresponding imaginary element of the second operand vector;

in response to a second form of the complex multiply instruction, the instruction decoder is configured to control the processing circuitry to perform the partial complex multiply operation with the first product comprising a product of a real element of the first operand vector and an imaginary element of the second operand vector, and the second product comprising a product of an imaginary element of the first operand vector and a real element of the second operand vector;

in response to one of the first and second forms of the complex multiply instruction, the instruction decoder is configured to control the processing circuitry to perform the partial complex multiply operation with said at least one target element comprising at least one real element of the destination vector;

in response to the other of the first and second forms of the complex multiply instruction, the instruction decoder is configured to control the processing circuitry to perform the partial complex multiply operation with said at least one target element comprising at least one imaginary element of the destination vector; and in response to at least one of the first and second forms of the complex multiply instruction, the instruction decoder is configured to control the processing circuitry to suppress updating of at least one element of the destination vector other than said at least one target element.

At least some examples provide a data processing apparatus comprising:

means for performing data processing; and means for decoding instructions to control the means for performing data processing to perform the data processing;

wherein the means for decoding is configured to decode a complex multiply instruction to control the means for performing data processing to perform a partial complex multiply operation on first and second operand vectors to set at least one target element of a destination vector to a value dependent on a result of adding or subtracting a first product and a second product, the first and second operand vectors and the destination vector each comprising a plurality of data elements including at least one real element for representing a real part of a complex number and at least one imaginary element for representing an imaginary part of a complex number;

in response to a first form of the complex multiply instruction, the means for decoding is configured to control the means for performing data processing to perform the partial complex multiply operation with the first product comprising a product of a real element of the first operand vector and a corresponding real element of the second operand vector, and the second product comprising a product of an imaginary element of the first operand vector and a corresponding imaginary element of the second operand vector;

in response to a second form of the complex multiply instruction, the means for decoding is configured to control the means for performing data processing to perform the partial complex multiply operation with the first product comprising a product of a real element of the first operand vector and an imaginary element of the second operand vector, and the second product comprising a product of an imaginary element of the first operand vector and a real element of the second operand vector;

in response to one of the first and second forms of the complex multiply instruction, the means for decoding is configured to control the means for performing data processing to perform the partial complex multiply operation with said at least one target element comprising at least one real element of the destination vector;

in response to the other of the first and second forms of the complex multiply instruction, the means for decoding is configured to control the means for performing data processing to perform the partial complex multiply operation with said at least one target element comprising at least one imaginary element of the destination vector; and in response to at least one of the first and second forms of the complex multiply instruction, the means for decoding is configured to control the means for performing data processing to suppress updating of at least one element of the destination vector other than said at least one target element.

At least some examples provide a data processing method comprising:

decoding a complex multiply instruction to control processing circuitry to perform a partial complex multiply operation on first and second operand vectors to set at least one target element of a destination vector to a value dependent on a result of adding or subtracting a first product and a second product, the first and second operand vectors and the destination vector each comprising a plurality of data elements including at least one real element for representing a real part of a complex number and at least one imaginary element for representing an imaginary part of a complex number;

wherein in response to a first form of the complex multiply instruction, the partial complex multiply operation is performed with the first product comprising a product of a real element of the first operand vector and a corresponding real element of the second operand vector, and the second product comprising a product of an imaginary element of the first operand vector and a corresponding imaginary element of the second operand vector;

in response to a second form of the complex multiply instruction, the partial complex multiply operation is performed with the first product comprising a product of a real element of the first operand vector and an imaginary element of the second operand vector, and the second product comprising a product of an imaginary element of the first operand vector and a real element of the second operand vector;

in response to one of the first and second forms of the complex multiply instruction, the partial complex multiply operation is performed with said at least one target element comprising at least one real element of the destination vector;

in response to the other of the first and second forms of the complex multiply instruction, the partial complex multiply operation is performed with said at least one target element comprising at least one imaginary element of the destination vector; and in response to at least one of the first and second forms of the complex multiply instruction, updating of at least one element of the destination vector other than said at least one target element is suppressed.

At least some examples provide a virtual machine computer program comprising program instructions to control a host data processing apparatus to provide an instruction execution environment corresponding to the apparatus discussed above.

A computer-readable storage medium storing the virtual machine computer program can also be provided. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus supporting execution of vector instructions;

Figure 5:
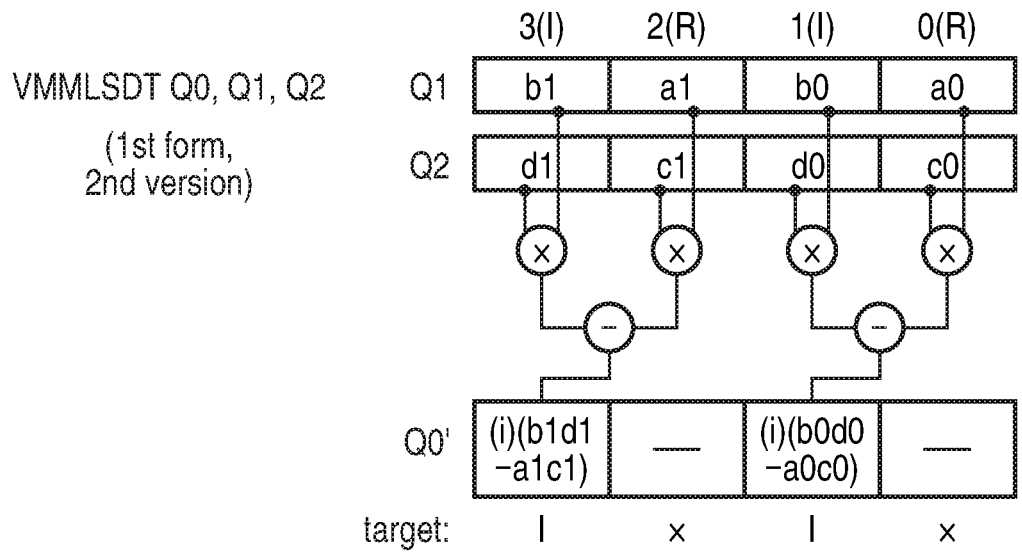
Figure 5:
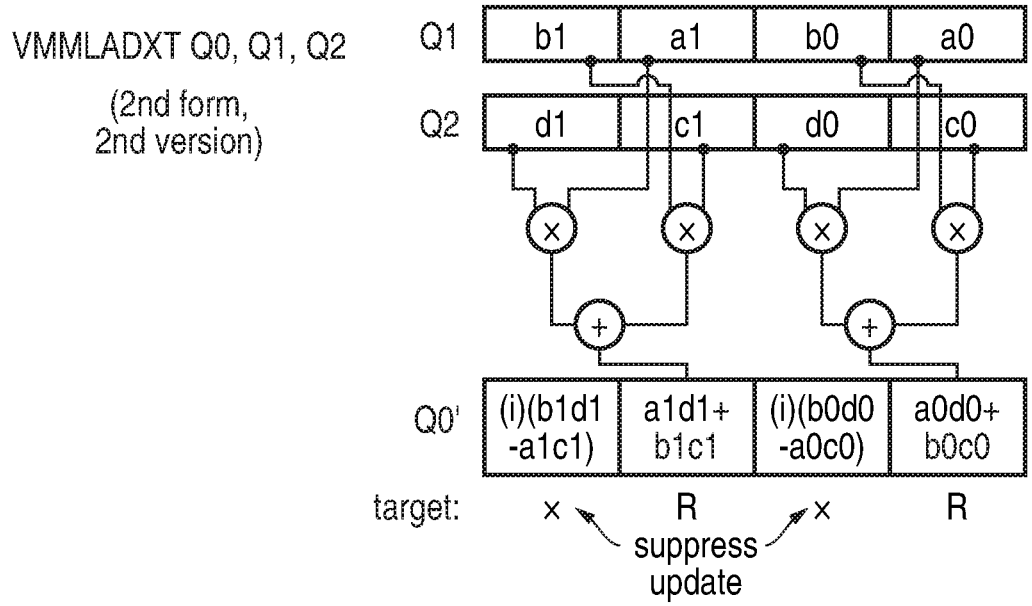
Figure 9:
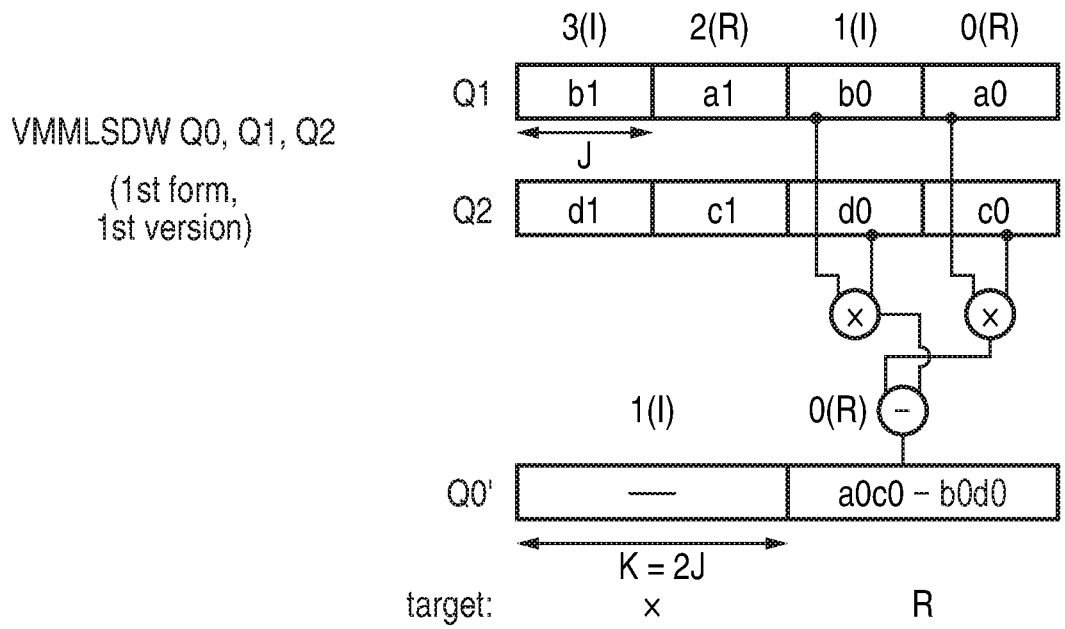
Figure 9:
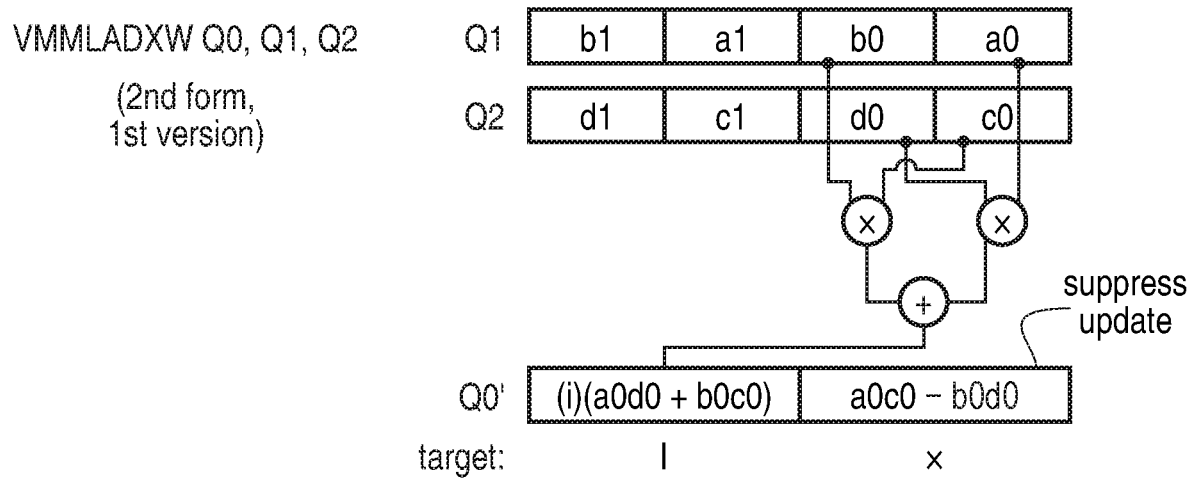
Figure 10:
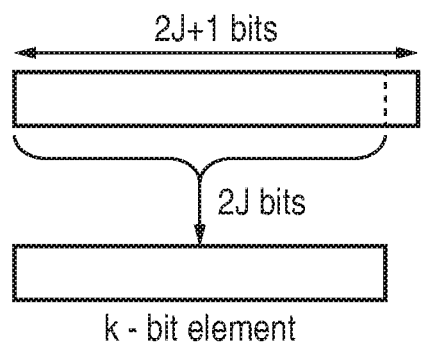
Figure 11:
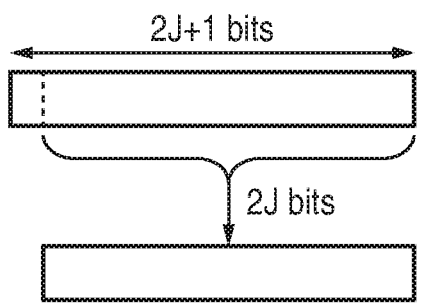
Figure 12:
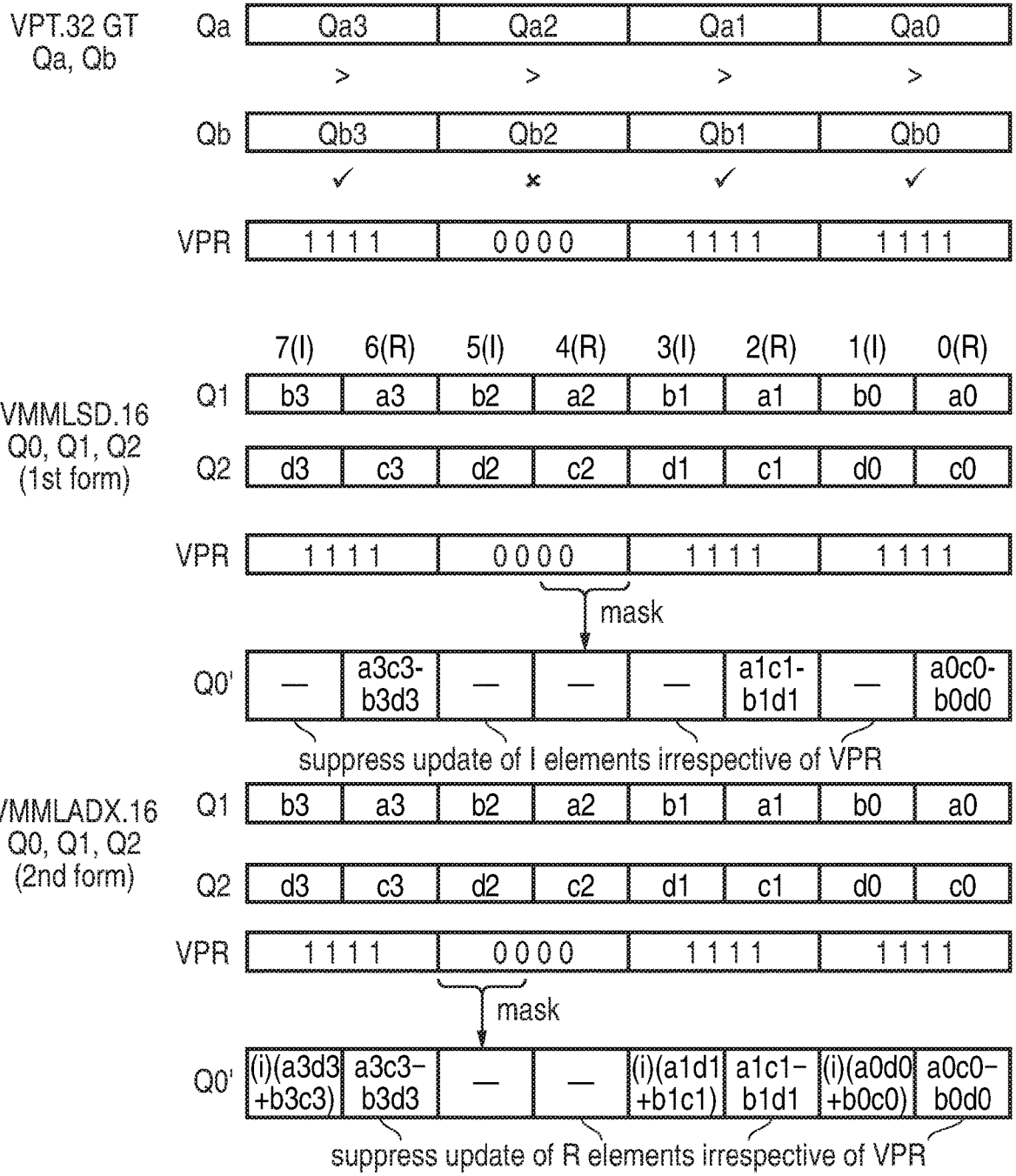
Figure 13:
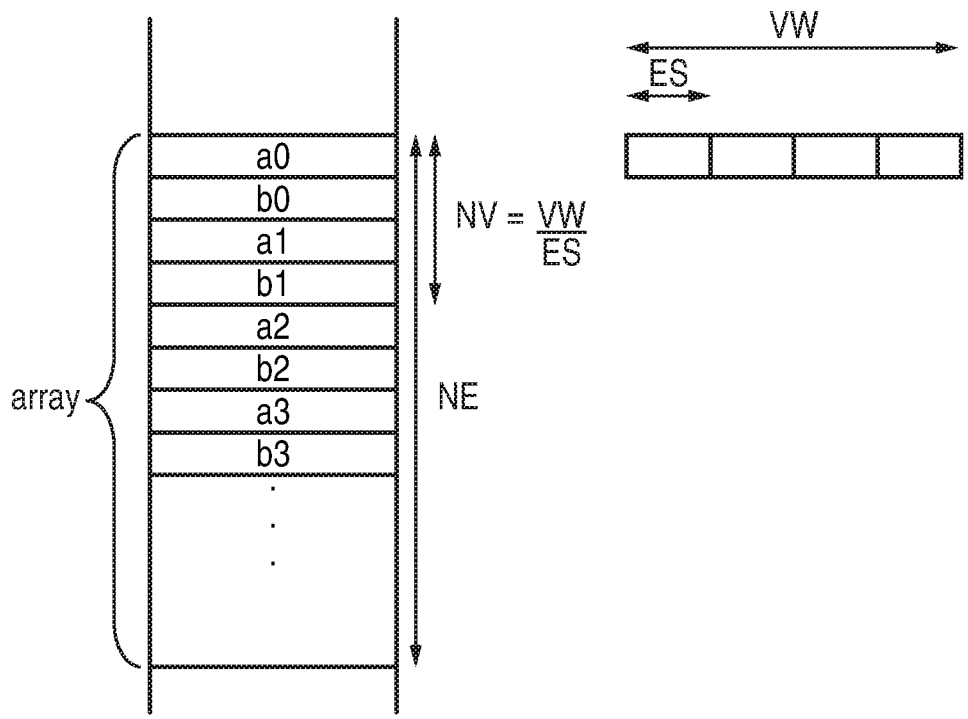
Figure 14:
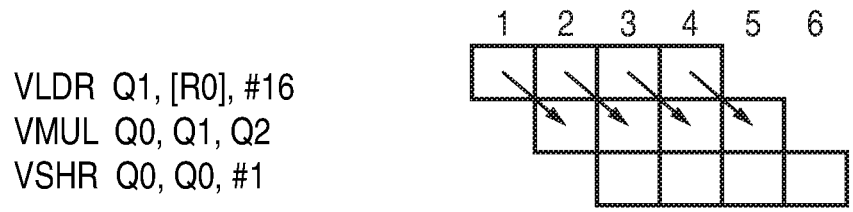
Figure 15:
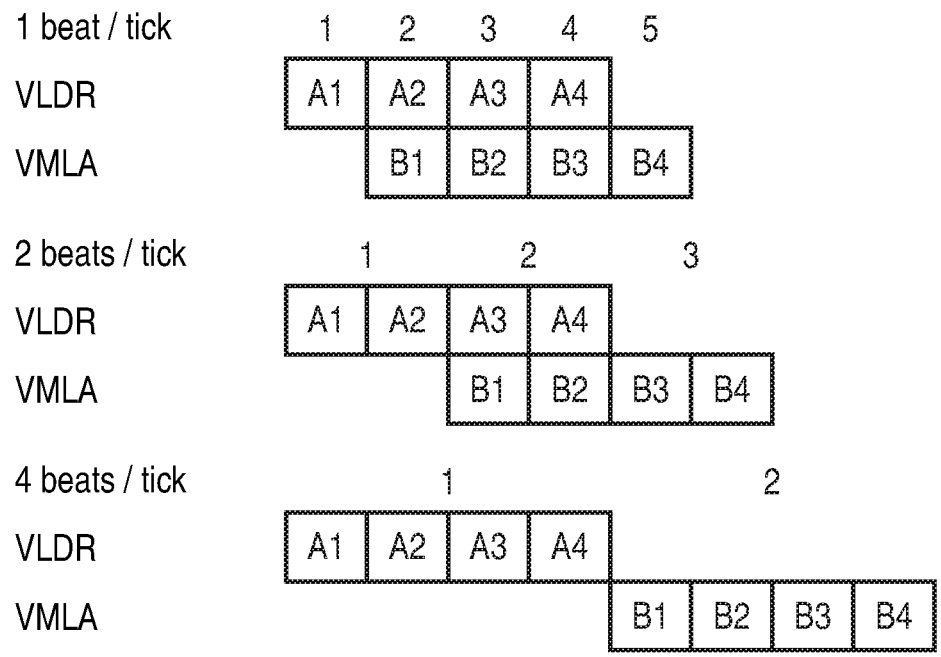
Figure 16:
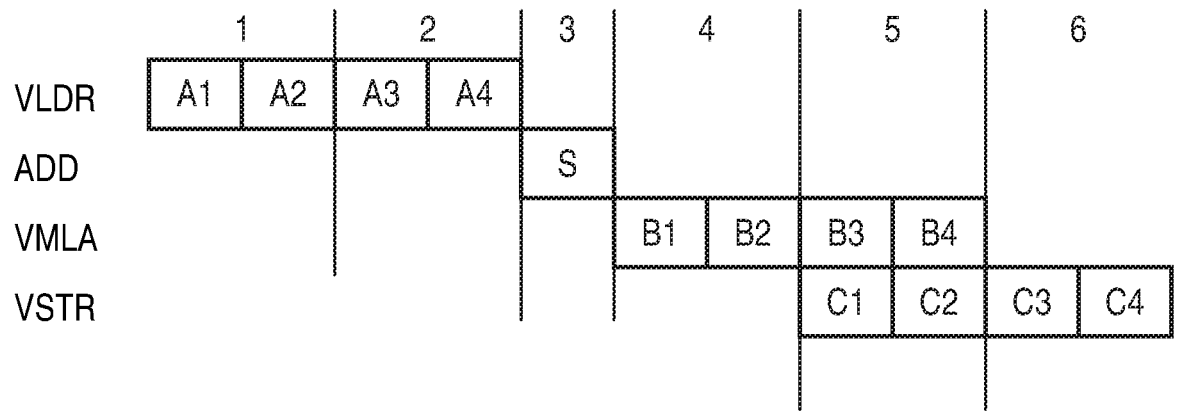
Figure 17:
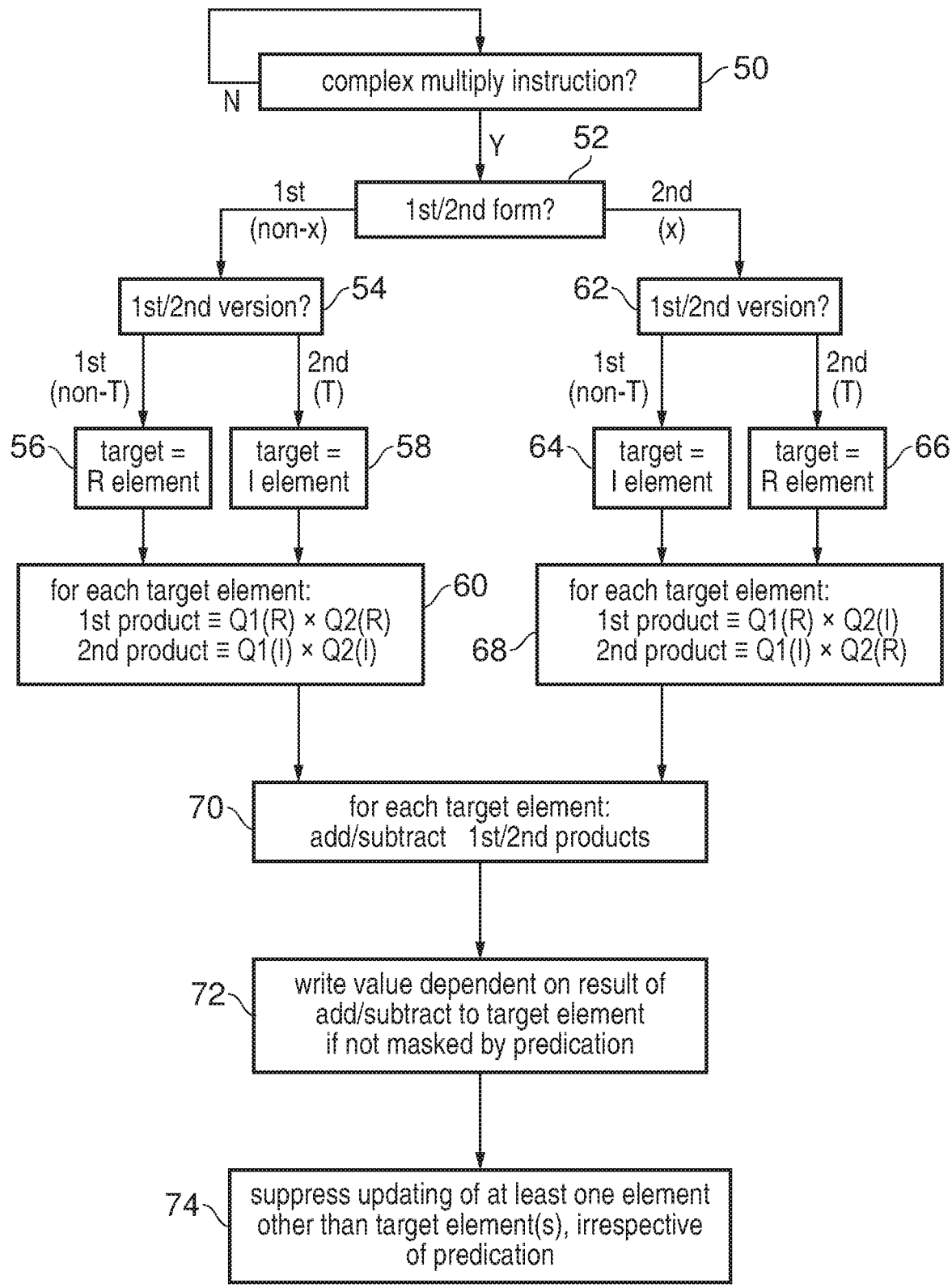
Figure 18:
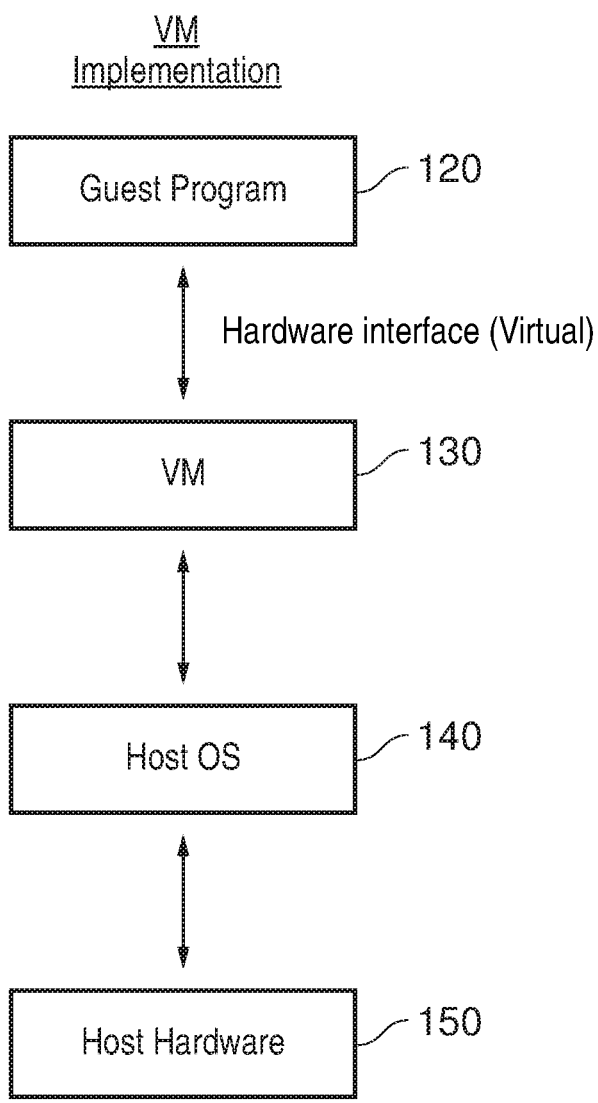

FIG. 5 schematically illustrates a second version of the first and second forms of complex multiply instruction;

FIG. 6 illustrates different examples of allocating real and imaginary elements of a vector for representing real or imaginary parts of a complex;

FIGS. 7 and 8 show different ways of performing truncation to generate a target element of the destination vector;

FIG. 9 shows an element-widening variant of the complex multiply instruction;

FIGS. 10 and 11 show two alternative ways of performing truncation in response to the element-widening variant of the instruction;

FIG. 12 schematically illustrates an example of controlling predication of a vector instruction by preceding it with a vector predicate instruction;

FIG. 13 schematically illustrates an example of controlling predication during processing of vectorised loops;

FIGS. 14 to 16 show examples of overlapping respective beats of execution of vector instructions;

FIG. 17 is a flow diagram illustrating a method of processing a complex multiply instruction; and FIG. 18 illustrates a virtual machine implementation that may be used.

Some specific examples will be discussed below. It will be appreciated that the invention is not limited to these particular examples.

A data processing apparatus has an instruction decoder which supports decoding of a complex multiply instruction to control processing circuitry to perform a partial complex multiply operation on first and second operand vectors to set at least one target element of a destination vector to a value dependent on a result of adding or subtracting a first product and a second product. The first and second operand vectors and the destination vector each comprise multiple data elements including at least one real element for representing a real part of a complex number and at least one imaginary element for representing an imaginary part of a complex number.

Two forms of the complex multiply instruction are provided. Both forms set at least one target element of the destination vector to a value dependent on a result of adding or subtracting a first product and a second product. For the first form of the complex multiply instruction, the instruction decoder controls the processing circuitry to perform partial complex multiply operation with the first product comprising a product of a real element of the first operand vector and a corresponding real element of the second operand vector, and the second product comprising a product of an imaginary element of the first operand vector and a corresponding imaginary element of the second operand vector. For the second form of the complex multiply instruction, the first product comprises a product of a real element of the first operand vector and an imaginary element of the second operand vector, and the second product comprises a product of an imaginary element of the first operand vector and a real element of the second operand vector. One of the first and second forms of the complex multiply instruction has the target element comprising at least one real element of the destination vector while the other targets at least one imaginary element of the destination vector. At least one of the first and second forms of the complex multiply instruction suppresses updating of at least one element of the destination vector other than the at least one target element.

This approach has several advantages. Firstly, providing a dedicated complex multiply instruction where the real and imaginary parts of a complex number are represented by respective elements of a vector can boost performance and reduce register pressure compared to systems which only support conventional vector multiply instructions, because this allows the multiplication of the form (a+ib)(c+id) to be calculated using fewer instructions and without needing to allocate so many vector registers for temporarily storing individual terms of the multiplication (e.g. ac, ibc, iad, −bd) temporarily before accumulating them into a final result. This reduced register pressure can be an important factor in relatively low power implementations since this reduces the need to spill and fill to memory, which can significantly improve performance. Also, providing first and second forms of the complex multiply instruction, one of which targets real elements of the destination and the other targets imaginary elements, enables a full complex multiplication result to be calculated using just two instructions and two vector register read ports. Avoiding the need for a third register read port to be implemented can provide a significant circuit area and power saving in relatively low power implementations.

For shorthand, the respective first and second products for the first/second forms of the instruction will be referred to below as:

R*R—the first product of the first form of the instruction, corresponding to a product of a real element of the first operand vector and a real element of the second operand vector.

I*I—the second product of the first form of the instruction, corresponding to a product of an imaginary element of the first operand vector and an imaginary element of the second operand vector.

R*I—the first product of the second form of the instruction, corresponding to a product of a real element of the first operand vector and an imaginary element of the second operand vector.

I*R—the second product of the second form of the instruction, corresponding to a product of an imaginary element of the first operand vector and a real element of the second operand vector.

The first and second forms of complex multiply instruction can be distinguished in any way, for example by using different opcodes, or by providing another parameter in the instruction encoding for specifying whether the instruction is of the first form or the second form.

The particular way in which the vectors are split into real elements and imaginary elements is an implementation choice which can be selected arbitrarily for a given processor implementation. Note that the numeric values stored in the real elements or imaginary elements of a vector need not themselves identify whether those elements are real or imaginary components of a complex number. The vector elements may simply store numeric values representing a multiple of 1 (for the real elements) or a multiple of i (for the imaginary elements). However the hardware of the processing circuitry may comprise circuit interconnections to read the real/imaginary elements from the appropriate positions within the vector and combine the real/imaginary elements according to the various products discussed above, and populate real or imaginary elements of the destination according to whether the instruction is of the first form or second form. Hence, whether an element is a real/imaginary element may be reflected in terms of the hardware interconnections provided in the processing circuitry for calculating the products, not the value stored in the vector itself. When writing or compiling a program using the complex multiply instruction, it may be up to the programmer or the compiler to populate the real and imaginary elements of the input operands with the appropriate values for representing the real and imaginary components of the complex numbers, and to interpret the results in the destination vector appropriately. Hence, the terms "real" and "imaginary" can be regarded as simply labels for a first subset of elements and a second subset of elements.

The processing circuitry may support different data element sizes within one vector. For example, a 128-bit vector could be split into two 64-bit data elements, four 32-bit data elements, eight 16-bit data elements or sixteen 8-bit data elements. The processing circuitry may determine the number of data elements based on a parameter associated with a complex multiply instruction, which could be specified in the instruction encoding as an immediate value or as a value indicating a register which contains the parameter. The parameter could indicate either the number of data elements, or the width of the data elements (number of bits per element), or any other value which allows the number of data elements to be determined.

Hence, in instances where the complex multiply instruction operates on vectors which only comprise two elements, the vectors may only have one real element and one imaginary element. On other instances of execution, the vectors may have more than two data elements, and in this case there are different ways of arranging the real/imaginary elements in the vector. It can be particularly useful for the real/imaginary elements to be interleaved within the vector. For example, the real elements could be the even-numbered elements and the imaginary elements could be the odd-numbered elements, or vice versa. By interleaving the real and imaginary elements, this can make the hardware design more efficient since the multiplications for forming the respective products to be added or subtracted by the first and second forms of the complex multiply instruction can be restricted to either being within the same vector lane or crossing only into the immediately adjacent vector lane, rather than requiring longer cross-lane signal paths which span two or more vector lanes.

When there are two or more real elements and two or more imaginary elements in the input vectors, the complex multiply instruction may trigger the processing circuitry to set two or more target elements of the destination vector, where each target element corresponds to the sum/difference of the first/second products calculated using a respective pair of real/imaginary elements of the first operand vector and a respective pair of real/imaginary elements of the second operand vector. For example, in the case where the real/imaginary elements are interleaved, each lane of two adjacent elements (one real element and one imaginary element) may have the target element (either a real element or imaginary element) set based on a result of processing the real and imaginary elements in the corresponding lanes in the first/second operand vectors.

As mentioned above, one of the first and second forms of the complex multiply instruction targets the real elements of the destination vector and the other targets the imaginary elements, with the first form calculating a sum or difference of R*R and I*I and the second form calculating a sum or difference of R*I and I*R. A complete complex multiplication would typically require one of each of R*R, I*I, R*I and I*R to be calculated, so by executing a pair of instructions specifying the same source registers and targeting the same destination register, including one instruction of each form, a complete complex multiply operation can be performed to generate a complex result comprising both the real and an imaginary part. The order in which the two forms of complex multiply instruction are executed does not particularly matter since either way both parts of the complex number are calculated. However, the one of the first and second forms of the complex multiply instruction which is executed second may suppress updating of at least one element of the destination vector other than the target element it is setting, to avoid overwriting the result of the previous complex multiply instruction. Hence, at least one of the first and second forms of the complex multiply instruction may trigger the processing circuitry to suppress updating of at least one non-target element of the destination vector other than the target element. If only one of the first and second forms of the instruction causes this suppression of updating, then this may compel a programmer or compiler to ensure that, within a pair of first/second forms of complex multiply instruction for calculating different parts of the same complex product, the form which does suppress updating of the non-target elements is executed second. However, greater flexibility can be provided if both the first and second forms of the complex multiply instructions trigger the processing circuitry to suppress updating the non-target elements, so that the programmer/compiler is free to code the first/second forms of the instruction in either order.

Some examples may support the predication of vector operations, where the processing circuitry is responsive to predication information to control masking of an operation associated with a certain portion of a destination vector. This can be useful for implementing if-then-type conditional operations for example. There are a number of ways of providing predication. For example, some systems may support predication instructions which can be executed before a vector instruction to evaluate the result of a comparison condition and set predicate information specifying which portions of the vector should be masked based on the results of the comparisons. Also, some systems may provide several general predicate registers which can be written to in order to set predicate information for masking some vector lanes of other instructions, in this case the vector instructions to be predicated may have a parameter indicating which of the predicate registers to predicate the instruction on. Another approach is for systems which support at the execution of vectorised loops to partially predicate some lanes of a vector when reaching the final iteration of the loop, when the total number of data elements to be processed by the loop is not an exact multiple of the vector length.

Regardless of how predication is performed, for the form of the complex multiply instruction which suppresses updating of a non-target element of the destination vector, this suppression may take place irrespective of whether the predication indication identifies that a portion of the destination vector corresponding to that non-target element is a portion to be masked. While the predication may affect whether a target elements is actually updated in response to the complex multiply instruction, a non-target element to be suppressed from being updated is not updated in response to the complex multiply instruction, even if the predication indication identifies that the corresponding portion of the destination vector should not be masked.

A number of variants of the complex multiply instruction can be provided. Each of these variants may have both a first form and a second form as discussed above where the first and second forms target one or other of the real and imaginary elements respectively.

For example, the instruction decoder may support an add-variant where the first and second products are added to generate the value to be set to the target elements, and a subtract variant where the first and second products are subtracted. This can be very useful for allowing both the standard complex multiplication of the form (a+ib)(c+id) and a complex conjugate multiplication of the form (a−ib) (c+id) to be carried out. For example the standard complex multiply may be implemented using a subtract-variant complex multiply instruction of the first form and an add-variant complex multiply instruction of the second form. A complex conjugate multiply operation can be implemented using an add-variant-complex multiply instruction of the first form and a subtract-variant complex multiply instruction of the second form. The add and subtract variants of the complex multiply instruction could be distinguished by having different opcodes or by another parameter of their instruction encoding.

The instruction decoder may also support a first (non-transposed) version and a second (transposed) version of the complex multiply instruction which differ in terms of which of the first and second forms targets the real elements and which target the imaginary elements of the destination vector.

For the non-transposed version, the first form targets at least one real element of a destination vector and the second form targets at least one imaginary element. Hence, the first form sets one or more real elements to a value corresponding to a sum or difference of R*R and 11, and the second form sets one or more imaginary elements to a value corresponding to a sum or difference of R*I and I*R. This allows conventional complex multiplications of the form (a±ib)* (c+id) to be calculated.

On the other hand, for the transposed version, the first form targets at least one imaginary element, and the second form targets at least one real element of a destination vector. Hence, the first form sets one or more imaginary elements to a value corresponding to a sum or difference of R*R and I*I, and the second form sets one or more real elements to a value corresponding to a sum or difference of R*I and I*R. This allows multiplications of the form ±i*(a±ib)*(c+id) to be calculated, where the two complex numbers are multiplied by an additional factor of ±i. This can be useful for some DSP algorithms, because it avoids the need for a further instruction to transpose the real/imaginary element of the vector to multiply the complex multiplication result by ±i.

In some implementations, the instruction decoder may only implement the first (non-transposed) version, or the second (transposed) version, while others may have instruction decoder support for both the first and second versions.

Other variants of the complex multiplying instruction may include an integer or fixed-point variant, where the products and sum/difference are calculated using integer/fixed-point arithmetic, and a floating-point variant, where the products and sum/difference are calculated according to floating-point arithmetic. For the floating-point variant, each element of the first/second operand vectors and destination vectors may be represented in a given floating-point format, e.g. double-, single- or half-precision floating point as defined by the IEEE. In some cases, different variants of the instruction may be provided corresponding to different floating-point formats.

There may also be different forms of the instruction which vary in terms of the relative size of the data elements in the first and second operand vectors compared to the destination vector. An element-widening variant may act on first and second operand vectors having J-bit data elements to generate a destination vector with wider K-bit data elements (e.g. K may be 2*J). Since the multiplications to generate the first/second products will result in wider data values, this approach can allow the added precision of the product to be retained in the final result. In practice, generating two products of J-bit values and adding or subtracting the products would normally yield a (2J+1)-bit value, so if this is to be reduced to a K-bit (2J-bit) value, then this may require some truncation by discarding a bit. One approach may be to select the most significant K bits of the intermediate value, and discard the least significant bit. However, the most significant bit of the 2J+1-bit (K+1-bit) intermediate value will almost always be a redundant bit, as the sum or difference of the first and second products would only overflow into the top bit only if the original values being multiplied all have their maximum possible magnitude. Therefore, another approach can be to discard the top bit of the intermediate value and select the least significant K bits as the truncated result, which allows the least significant bit to be retained, which is more likely to provide useful information for maintaining precision.

An element-size-preserving variant of the complex multiply instruction may also be provided where the destination vector has J-bit data elements of the same size as the J-bit data elements of the first and second operand vectors. Again, some truncation of an intermediate value corresponding to the result of adding or subtracting the first and second products may be required. Again, the truncation could use the most significant J bits of the intermediate value, or ignore the top bit and select the next most significant J bits as the top bit is likely to be a redundant bit.

When performing the truncation, simply discarding bits lower than the selected J bits may lead to a bias in the results of a sequence of complex multiplications, as it would tend to systematically reduce the magnitude of the results. To reduce the bias, when truncating the intermediate value, the selected J bits may be rounded based on at least one less significant bit of the intermediate value than the selected J bits (e.g. by adding the bit value of the most significant discarded bit to the bit position of the intermediate value corresponding to the least significant bit of the selected J bits, prior to selecting the J bits, to effectively round the truncated value to the nearest value of the 2J+1 intermediate result that is representable using J bits).

Some systems may support processing of an entire vector instruction in parallel, with each of the elements of the result vector being generated in parallel. However, for some lower power implementations there may not be enough hardware to calculate all the elements of the destination vector in parallel. In some implementations, in response to a given vector instruction the processing circuitry may perform a multiple beats of processing, each beat corresponding to a portion of a vector value, and the processing circuitry may support overlapped execution of first and second vector instructions in which first subset of beats of the second vector instruction is performed in parallel with the second subset of beats of the first vector instruction. A beat may correspond to a certain fixed sized portion of a vector, which may be independent of the data element size. Overlapping the execution of multiple vector instructions can allow greater utilization of hardware resources. The overlapping nature of the execution may be visible to software such as an exception handler running on the system, or to a debugger. Such overlapped execution can also be used for the complex multiply instruction of the form discussed above.

Figure 1:
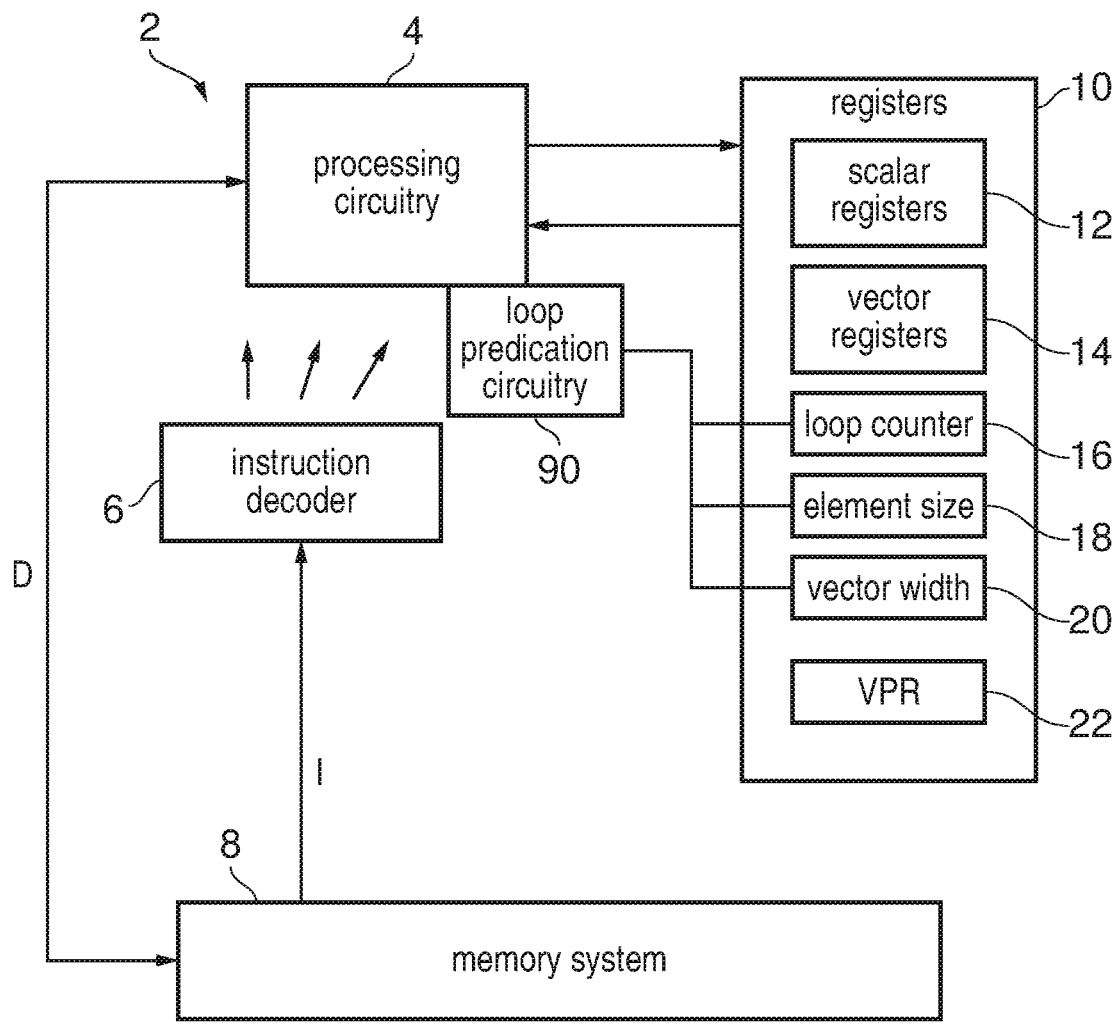

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by an instruction set architecture. For example the decoder 6 may interpret the opcodes of the decoded instructions and any additional control fields of the instructions to generate control signals which cause a processing circuitry 4 to activate appropriate hardware units to perform operations such as arithmetic operations, load/store operations or logical operations. The apparatus has a set of registers 10 for storing data values to be processed by the processing circuitry 4 and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing logic. The memory system 8 may include one or more levels of cache as well as main memory.

The registers 10 include a scalar register file 12 comprising a number of scalar registers for storing scalar values which comprise a single data element. Some instructions supported by the instructions decoder 6 and processing circuitry 4 are scalar instructions which process scalar operands read from scalar registers 12 to generate a scalar result written back to a scalar register.

The registers 10 also include a vector register file 14 which includes a number of vector registers each for storing a vector value comprising multiple data elements. In response to a vector instruction, the instruction decoder 6 controls the processing circuitry 4 to perform a number of lanes of vector processing on respective elements of a vector operand read from one of the vector registers 14, to generate either a scalar result to be written to the scalar registers 12 or a further vector result to be written to a vector register 14. Some vector instructions may generate a vector result from one or more scalar operands, or may perform an additional scalar operation on a scalar operand in the scalar register file as well as lanes of vector processing on vector operands read from the vector register file 14. Hence, some instructions may be mixed-scalar-vector instructions for which at least one of one or more source registers and a destination register of the instruction is a vector register 14 and another of the one or more source registers and the destination register is a scalar register 12. Vector instructions may also include vector load/store instructions which cause data values to be transferred between the vector registers 14 and locations in the memory system 8. The load/store instructions may include contiguous vector load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or store data from respective elements of a vector register to the discrete addresses.

The processing circuitry 4 may support processing of vectors with a range of different data element sizes. For example a 128-bit vector register 14 could be partitioned into sixteen 8-bit data elements, eight 16-bit data elements, four 32-bit data elements or two 64-bit data elements for example. A control register within the register bank 10 may specify the current data element size being used, or alternatively this may be a parameter of a given vector instruction to be executed.

The register bank 10 also includes registers for storing control information for controlling the operation of the processing circuitry 4. The control registers may include registers such as a program counter register for indicating an address of an instruction corresponding to a current point of execution, a stack pointer register indicating an address of a location in the memory system 8 of a stack data structure for saving/restoring register state when handling of the exception, and a link register for storing a function return address to which processing is to branch following the execution of a function. These are not illustrated in FIG. 1 for conciseness.

As shown in FIG. 1, the registers also include a loop counter 16 for tracking the progress of vectorised loops, an element size register 18 for storing a parameter indicating the number of bits in each data element in a vector currently being processed, a vector width register 20 for storing a parameter indicating the total number of bits in one vector register and a vector predicate register 22 for controlling predication of vector operations. These will be described in more detail below. In some examples, the vector width register 20 may be hardwired during the manufacture of the apparatus depending on the particular vector width implemented in the vector registers 14 for a given device. Alternatively, if the vector register file 14 supports different configurations with different vector widths then the vector width register 20 could be programmable to indicate the current width being used. Similarly, the element size register 18 could either be hardwired if a particular element size is always used for a given apparatus, or variable if the apparatus supports processing with vectors of different data element size. In some examples, the element size register 18 may be omitted, for example if each vector instruction specifies the element size to be used for that instruction. While the loop counter 16 is shown as a dedicated control register, other examples may use one of the general purpose scalar registers 12 to track the progress of vectorised loops.

Instructions for performing complex arithmetic, where the real and imaginary parts of a complex number are interleaved in a vector register, can boost performance and reduce register pressure. In implementations which only have relatively few vector registers (e.g. some hardware systems may only provide 8 vector registers), register pressure can be an important factor in overall processor performance since if there are not enough registers to accommodate all the values to be processed then this may require additional load/store operations for spilling register contents out to memory and reading the values back into the register file later on. In a system with 8 vector registers for example, without complex arithmetic support in the instruction decoder, standard vector multiply instructions would only allow a radix 2 FFT to be implemented without register spilling, but with complex arithmetic support, a radix 4 FFT can implemented without register spilling. As a result, the overall speed up produced by adding complex arithmetic instructions can be as great as 56% on a Q31 FFT.

Figure 2:
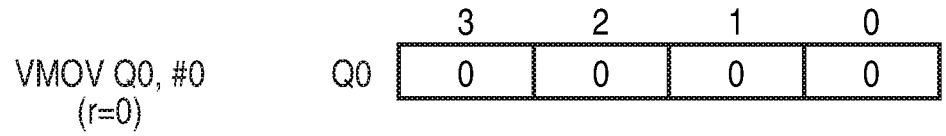
FIG. 2 is a comparative example showing an alternative approach for multiplying two complex numbers using vector instructions.
Figure 2:
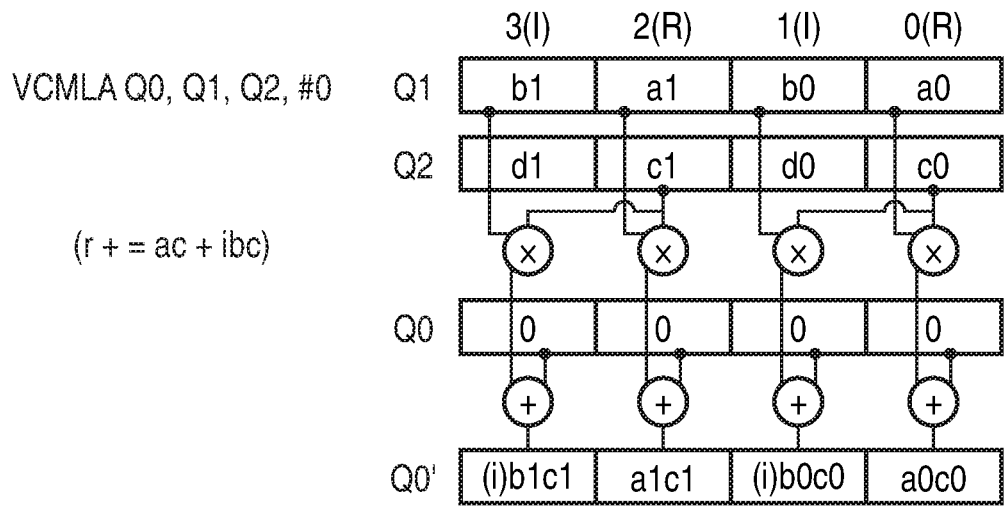
Figure 2:
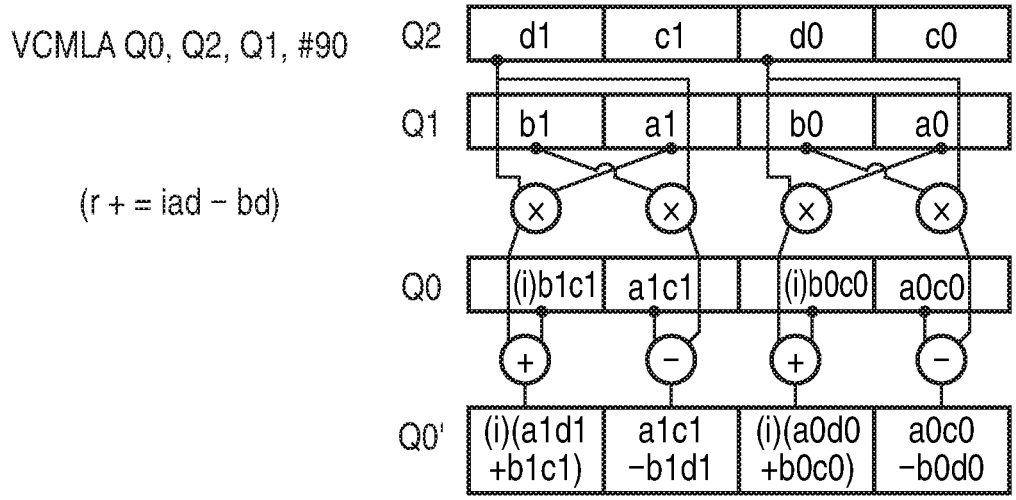

However, the particular way in which the complex multiply instructions are implemented may have an impact on performance, circuit area and power consumption. FIG. 2 shows a comparative example of using complex multiply instructions according to an alternative approach. As shown at the top of FIG. 2, multiplying two complex numbers a+ib and c+id requires four multiplications to produce the product terms ac, ibc, iad, −bd, and so it is often not practical to implement a complex multiplication with one vector instruction. In the approach shown in FIG. 2, a VMOV instruction is executed first to clear an accumulator vector register Q0 to zero. Then, two complex multiply vector instructions are executed, each taking as inputs the accumulator register Q0 and two input operand vectors Q1, Q2. Each of the vector registers Q0, Q1, Q2 has its even-numbered elements 0, 2 allocated as real elements (R) for representing a real part of a complex number, and its odd-numbered elements 1, 3 allocated as imaginary elements (I) for representing an imaginary part of a complex number. Pairs of adjacent real/imaginary elements 0, 1 and 2, 3 each represent a different complex number, e.g. elements 0, 1 of vector Q1 represent a complex number a0+ib0, and elements 2, 3 of vector Q1 represent a different complex number a1+ib1. Similarly, the Q2 register represents corresponding complex numbers c0+id0 and c1+id1 to be multiplied with the corresponding contents of register Q1. The first of the complex multiply instructions VCMLA calculates the first two terms ac, ibc of the sum shown at the top of FIG. 2, and accumulates its results into the accumulator register Q0. Similarly, the second complex multiply instruction calculates the third and fourth terms iad, −bd of the sum shown in FIG. 2, and accumulates these into the accumulator register Q0. In the final accumulator value, each pair of adjacent real/imaginary elements represents a complex value corresponding to the product of the complex numbers represented by the corresponding portions of Q1, Q2.

On larger scale implementations, this approach can have some advantages since, for example, this approach can be more efficient for out-of-order processors. However, on lower power implementations, there can be some disadvantages. Firstly, an additional instruction is required to zero the accumulator register Q0, which reduces code density in memory and reduces performance. Also, each vector multiply instruction requires three input vectors (the old value of accumulator register Q0 and the two input vectors Q1, Q2), because they accumulate their results into the accumulator register Q0. Therefore, a third vector register read port is required. On relatively small scale implementations there may be no other instructions which require more than two vector read ports, so the area and power cost of adding a third register read port for just one type of instruction may be very hard to justify.

Figure 3:
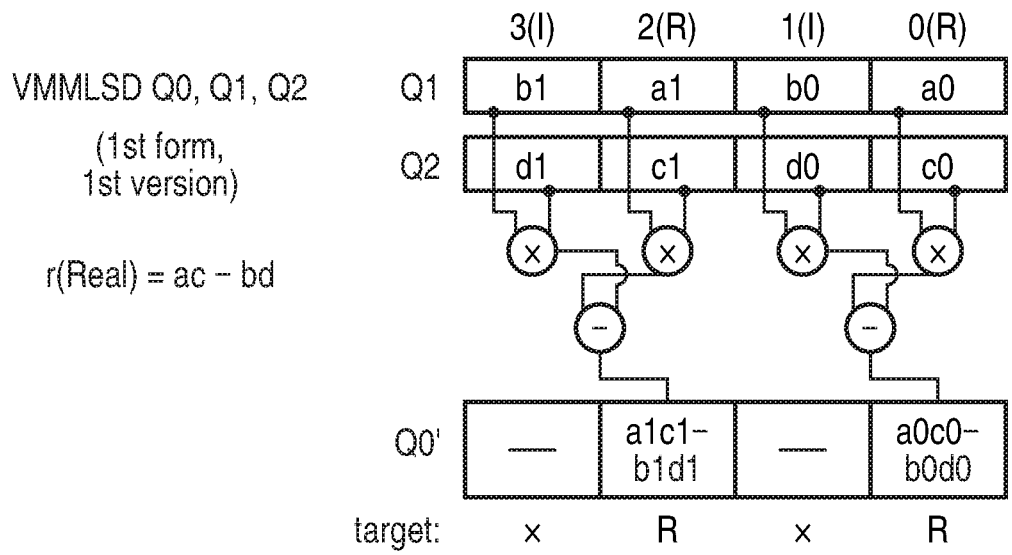
FIG. 3 shows an example of multiplying two complex numbers using a first form and a second form of a complex multiply instruction.
Figure 3:
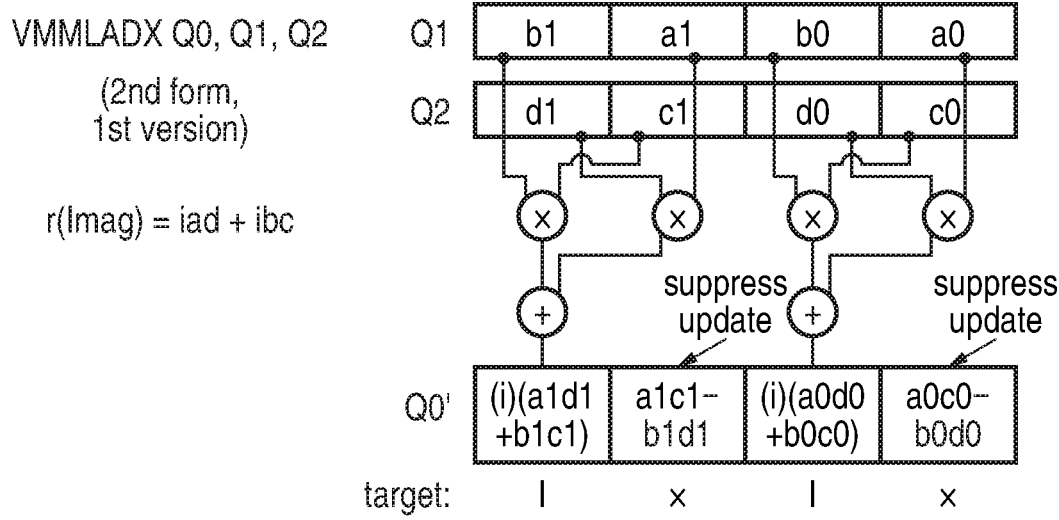

This can be avoided by using instructions of the form shown in FIG. 3. As shown in the sum at the top of FIG. 3, the complex multiplication can be refactorised so that the real part of the result is calculated by one instruction and the imaginary part is calculated by another. First and second forms of the instruction are provided, one of which targets the real elements of the destination vector and the other targets the imaginary elements. In each pair of adjacent vector lanes, the first form of the instruction (indicated in the examples below by an instruction mnemonic without an 'X') generates a first product ac (R*R) and a second product bd (I*I), adds or subtracts the first and second products, and writes the result to a corresponding target element (in this example, a real element). On the other hand, for each pair of adjacent vector lanes, the second form of the instruction (indicated by an instruction mnemonic with an 'X') generates a first product ad (R*I) and a second product bc (I*R), adds or subtracts the first and second products, and writes the result to a corresponding target element (in this example, an imaginary element). Since each instruction writes to half the elements, after the two forms of the instruction have been performed the whole register has been written, avoiding the need to zero the register first. In addition since the target elements for each form of the instruction contain all the required products there is no need to accumulate onto a previous result, and so the need for a third register read port and additional instruction for clearing the accumulator can be avoided.

Add and subtract variants of the instruction are provided. For the add-variant (indicated by a mnemonic VMMLAD or VMMLADX), the first/second products are added to form the corresponding target element. For the subtract-variant (indicated by an mnemonic VMMLSD or VMMLSDX), the first/second products are subtracted to form the corresponding target element. Hence, in FIG. 3 a subtract-variant instruction of the first form (VMMLSD) is executed, to set element 0 (a real element) of register Q0 to a value a0c0−b0d0 representing the real part of the complex product of the values a0+ib0 and c0+id0 in the corresponding portions of registers Q1, Q2, and to set element 2 (a real element) of register Q0 to a value a1c1−b1d1 in a similar way. An add-variant instruction of the second form VMMLADX is also executed to set element 1 (an imaginary element) of register Q0 to a value a0d0+b0c0 representing the imaginary part of the complex product of values a0+ib0 and c0+id0 in register Q1, Q2, and to set element 3 (an imaginary element) of register Q0 to a value a1d1+b1c1 in a similar way.

Figure 4:
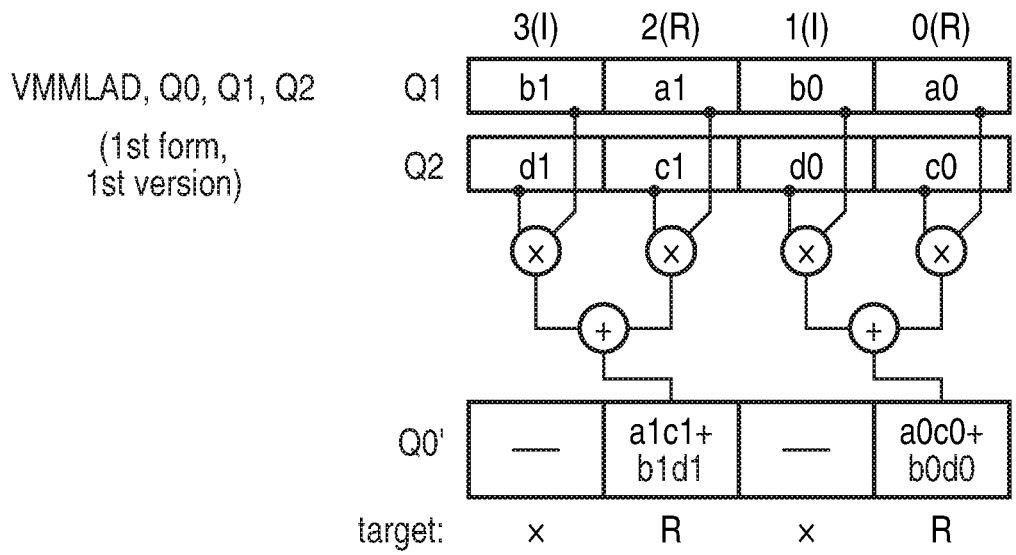
FIG. 4 shows an example of using the first and second forms of the instruction to calculate a complex conjugate multiplication.
Figure 4:
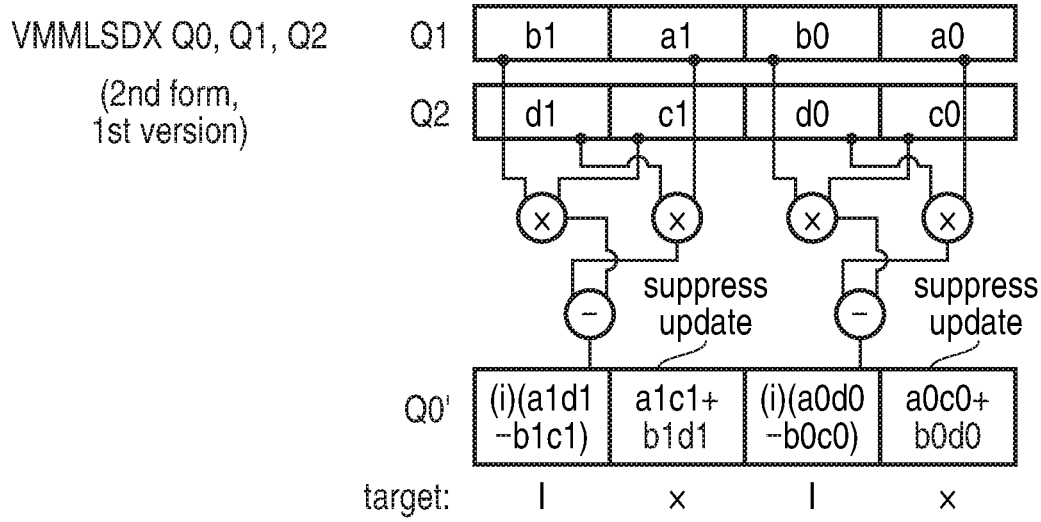

Alternatively, as shown in FIG. 4, by executing an add-variant instruction of the first form (VMMLAD) and a subtract-variant instruction of the second form (VMMLSDX), a complex conjugate multiplication of the form r=(a−ib)(c+id) can be calculated. Hence, the first form targets the real elements of the destination vector Q0 based on a sum of R*R and I*I products, and the second form targets the imaginary elements based on a difference of R*I and I*R products.

In both examples of FIGS. 3 and 4, the instructions are of a first version (non-transposed version indicated with an instruction mnemonic without a 'T') where the first form of the instruction targets the real elements of the destination register Q0 and the second form targets the imaginary elements.

However, as shown in FIG. 5 a second version of these instructions can also be provided in which the first form of the instruction targets the imaginary elements and the second form targets the real elements. The second version is a transposed version indicated by instruction mnemonics including a 'T'. Hence, this time the real elements of the destination register Q0 are set based on the R*I and I*R products, and the imaginary elements are set based on the R*R and I*I products. As shown in FIG. 5, this can be useful for evaluating calculations of the form ±i*(a+ib)*(c+id). Otherwise, the operation in FIG. 5 is similar to that in FIGS. 3 and 4.

In response to one or both of the first/second form of complex multiply instructions, the instruction decoder 6 controls the processing circuitry 4 to suppress updating of the non-targeted elements, to avoid overwriting the results of the earlier instruction. If only one of the first/second forms triggers such suppression of updates to the non-target elements, then that instruction should be executed second in the pair of instructions. However, if both forms suppress updating of the non-targeted elements, then the pair of instructions can be executed in either order.

FIGS. 3 to 5 show examples where the real elements are the elements with even-numbered positions 0, 2, and the imaginary elements are the odd-numbered elements 1, 3. However, as shown in FIG. 6, the real and imaginary elements could also be the other way round with the imaginary elements corresponding to the even numbered elements, and the real elements corresponding to the odd numbers. As shown in the top two examples of FIG. 6, it can be useful to interleave the real and imaginary elements so that all the multiplications shown in FIGS. 3 to 5 stay within pairs of adjacent vector lanes rather than requiring multiplications across two or more lanes. Nevertheless, as shown in the bottom example of FIG. 6, it could also be possible to arrange the real and imaginary elements differently.

While the instructions of the type shown above are suitable for calculating results of complex multiply operations, they could also be used for other purposes. While the real elements are suitable for representing real components of complex numbers, and the imaginary elements are suitable for representing the imaginary components, a programmer may be able to find another use for the same instructions. For example, executing the add variant of the complex multiply instruction shown in FIG. 4 could be a relatively simple way of accumulating the sums of products of adjacent lanes into a single element of a destination register, and so some programmers may choose to use this type of instruction for some processing of real numbers as well. Hence, the instructions are not limited solely to use for complex arithmetic.

In the examples of FIGS. 3 to 5, the instructions preserve the size of the data elements, so the destination register Q0 has data elements of the same size as the input operands Q1, Q2. However, if the integer/fixed point arithmetic was used and the data elements each comprise J bits, the sum of two products of J-bit elements would have 2J+1 bits, and so a truncation is performed to generate the J-bit value to be written to a given target element. FIG. 7 shows a first approach for performing the truncation. In this case, the upper J bits [2J:J+1] of the 2J+1-bit intermediate result [2J:0] are selected to be written to the target element, and to reduce bias the result may be rounded by adding the bit value 1 in the next most significant bit position [J] to the intermediate result before the truncation is performed and the J-bit result is written to the target element. It will be appreciated that other forms of rounding may also be performed.

FIG. 8 shows an alternative approach to truncation, which ignores the most significant bit of the intermediate result, and instead selects the next J most significant bits [2J−1:J] of the intermediate result when performing the truncation, and rounds the selected bits based on the next most significant bit [J−1]. This can often allow greater precision since the most significant bit [2J] of the 2J+1-bit intermediate results is often a redundant bit, as this bit would only be used if the original input elements all have the greatest possible positive or negative magnitude. Hence, bit [J] is more likely to contain an "interesting" result than bit [2J] and so it may be preferred to retain this bit in the final result. With this approach, since the most significant bit [2J] is never used, it does not need to be calculated explicitly by the hardware (e.g. the hardware may only have circuitry for determining the bottom 2J bits of the 2J+1-bit intermediate result). To ensure that the most significant bit of the (2J+1)-bit intermediate result is always a redundant bit (so that no information is lost by ignoring the most significant bit), the instruction set architecture may require a programmer or compiler to divide all the input values by 2 before performing the complex multiplication (hence avoiding the extreme magnitudes which would require the most significant bit), and then once the result of the complex multiplication has been generated, multiply the result by 4, to give the same numeric result as if the most significant bit of the intermediate result had been calculated.

While FIGS. 7 and 8 show an example of performing rounding using only one less significant bit lying one place below the cut-off for the truncation, it is also possible to use rounding techniques which consider a greater number of less significant bits. In particular, for floating-point variants of the instruction, additional bits may be considered according to known floating-point rounding techniques.

As shown in FIG. 9, it is also possible to provide an element widening variant of the instruction, which generates a destination vector Q0 where the elements are twice the width of the elements of the inputs operand Q1, Q2. In this case, only half the input elements may affect the result. The complex multiply instruction may specify whether the destination should be calculated using the upper half or the lower half of the elements of the operand vectors Q1, Q2 (e.g. in FIG. 9 the instruction acts on the lower half of the operand vectors). For the element widening variant, truncation of the 2J+1-bit intermediate value to form a 2J-bit wider data element can be done by selecting the most significant 2J bits [2J:1] as shown in FIG. 10 (similar to FIG. 7), or by ignoring the most significant bit and selecting the least significant 2J bits [2J−1:0] as shown in FIG. 11 (similar to FIG. 8).

The examples discussed above show input vectors each comprises 4 data elements (2 real elements and 2 imaginary elements interleaved), but it will be appreciated that the instruction can also be executed with different numbers of elements.

As shown in FIG. 12, the complex multiply instructions may be subject to predication by preceding the instructions by a vector predication instruction (VPT instruction) which compares respective elements of two input vectors QA, QB to determine whether they meet some test condition, and sets a vector predicate register (VPR) 22 according to the results of each comparison. The VPR 22 includes a number of predicate flags each corresponding to a portion of a vector register, at the granularity of the minimum element size supported by the processing circuitry 4. For example, for 128-bit vector registers, where the minimum element size is 8 bits, 16 predicate flags can be provided each corresponding to an 8-bit chunk of the vector register.

In this example, the test condition is whether a given element of Qa is greater than or equal to the corresponding element of Qb, but other examples of test conditions include greater than or equal, less than, less than or equal, equal or not equal. In this example, the test condition was passed in lanes 0, 1 and 3 but failed in lane 2. Hence, in response to the VPT instruction, the processing circuitry 4 sets predicate flags to 0 in the portion of VPR 22 corresponding to lane 2, and predicate flags to 1 in the other portions of the VPR corresponding to lanes 0, 1, 3. As in this example the element size for the VPT instruction is 32 bits (greater than the minimum element size of 8 bits), a block of 4 adjacent predicate flags is set to 0 or 1 corresponding to each respective lane. In this example, a predicate flag of 0 indicates that a corresponding portion of a vector operation should be masked, while 1 indicates that the corresponding portion should not be masked, but other examples could use the opposite mapping.

When the complex multiply instructions are then executed subsequent to the VPT instruction, the processing circuitry 4 masks the operation associated with a given portion of the destination vector if the VPR has the corresponding predicate flag set to 0. In this example, as the predicate flags are 0 in the portion of VPR corresponding to elements 4/5 of the destination vector, these elements are not updated in response to either complex multiply instruction. Hence, the first form of the complex multiply instruction VMMLSD does not update element 4 of the destination vector Q0 even though it is a real element which would normally be targeted by this instruction, because the corresponding portion of the VPR was 0. The other real elements 0, 2 and 6 are updated, because they correspond to predicate bits equal to 1 in the VPR 22. Similarly, the second form of the instruction does not update element 5 because it is also masked by the VPR, but still writes to the imaginary elements 1, 3, 7. For both forms of the complex multiply instruction, the non-targeted elements are suppressed from being updated, irrespective of whether the corresponding values in the VPR are 1 or 0.

There are a number of ways in which the operation associated with a given portion of the register can be masked when the VPR has a predicate bit of 0. For example, masking could be implemented by clearing the corresponding portion of the destination register to 0, retaining the previous value stored in that portion of the destination register, or by suppressing the operation associated with that portion from being performed at all (e.g. not performing the load from memory, multiplication, addition or subtraction for that lane). In some implementations, the hardware provided for masking updates to some portions of the destination register in response to the predicate information can be reused to also suppress updates of the non-targeted elements in response to a complex multiply instruction. However, unlike with predication, this masking of the non-targeted elements would take place in response to a complex multiply instruction irrespective of the contents of the corresponding portion of the VPR 22.

FIG. 13 shows another example of predication. A common use for vector instructions is in vectorised loops where a certain sequence of operations needs to be applied to each element of an array stored in memory. A loop iterating once per element in high level code can be compiled into vectorised code comprising a loop with fewer iterations, each of which loads a block of elements into a vector register, processes the elements using a series of vector instructions, and stores the results of each lane of processing back to memory. Hence, each iteration of the loop may process a block of elements corresponding to the number of data elements in one vector register. If the total number of elements in the array to be processed is NE, and the number of data elements in one vector NV (equal to the vector width VW divided by the data element size ES), then the entire array can be processed in a minimum of NE/NV iterations. However, often the total number of elements NE may not be an exact multiple of the number of elements NV in one vector, and so in the last iteration of the loop, not all of the elements of the vector will be filled with values to be processed. If the processing in unfilled lanes is allowed to proceed unmasked, this can cause errors. For example, the memory address space beyond the end of the array may not have been mapped in page tables, so there could be a memory access fault or corruption of data adjacent to the array if a load/store operation is performed for one of the "unused" lanes in the final iteration processing the tail of the array.

Therefore, it can be desirable to mask the operations in the unused lanes in the final iteration of the loop. As shown in FIG. 1, the processing circuitry 4 may be provided with loop predication circuitry 90 for controlling which lanes of a given vectorised loop are enabled or masked. On starting a vectorised loop, the loop counter 16 can be set to a value specifying the total number of elements NE to be processed in the loop. For example, a loop start instruction may specify the number of elements. At the end of each iteration of the loop, the number of elements in one vector NV is subtracted from the loop counter 16, to calculate $NE_{remaining}$ the number of remaining elements to be processed. On starting a given loop iteration, if $NE_{remaining} < NV$, then the loop predication circuitry 90 controls the processing circuitry 4 to mask operations associated with the upper $NV-NE_{remaining}$ lanes of vector processing, e.g. by suppressing the lanes of vector processing themselves (e.g. preventing load/store requests being issued) and/or disabling writing of results of processing in the masked lanes.

Hence, if a complex multiply instruction is executed in an iteration when the loop predication circuitry 90 has determined that some lanes should be masked, then the target elements (real or imaginary depending on the form and version of the instruction) would not be updated in those masked lanes. For example, in FIG. 13 the loop predication circuitry 90 determines that lanes 2 and 3 of the vector should be masked, so the VMMLSD instruction updates only the element 0 (a real element) in the non-masked lane, and does not update the element 2 (a real element) in the masked lane. The non-target element (imaginary in this example) in a non-masked lane 1 is still not updated by the complex multiply instruction, regardless of whether any lanes are predicated by the loop predication circuitry 90.

The examples above show the operations in each lane of the vector as taking place in parallel, but this is not essential.

The processing circuitry 4 may include a number of distinct hardware blocks for processing different classes of instructions. For example, load/store instructions which interact with a memory system 8 may be processed by a dedicated load/store unit, while arithmetic or logical instructions could be processed by an arithmetic logic unit (ALU), 204. The ALU itself may be further partitioned into a multiply-accumulate unit (MAC) for performing in operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or reuse the same hardware blocks.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 14. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Instead, an architecture may support a range of different overlaps as shown in examples of FIG. 15. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed.

The size of the portion of a vector processed in one beat is defined by the architecture and can be an arbitrary fraction of the vector. In the examples of FIG. 15 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the data element size of the vector being processed. Hence, even if the element size varies from implementation to implementation or at run time between different instructions, a beat is a certain fixed width of the vector processing. If the portion of the vector being processed in one beat includes multiple data elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form a data element.

As shown in FIG. 15 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture are ignored during further description of this disclosure.

As shown in the lower example of FIG. 15, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 15, instruction execution can be overlapped with the first and second beats of a second vector instruction carried out in parallel with the third or fourth beats of a first instruction, where those instructions are executed on different execution units within the processing circuitry (e.g. in FIG. 15 the first instruction is a load instruction executed using the load/store unit and the second instruction is a multiply accumulate instruction executed using the MAC).

A yet more energy/area-efficient implementation may provide hardware units which are narrower and can only process a single beat at a time, and in this case one beat may be processed per tick, with the instruction execution overlapped and staggered by one beat as shown in the top example of FIG. 15 (this is the same as the example shown in FIG. 14 above).

It will be appreciated that the overlaps shown in FIG. 15 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 may be provided with circuitry for controlling the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

As shown in FIG. 16, the overlap between two vector instructions may also be prevented if there is an intervening scalar instruction. This is because the scalar instruction could depend on the outcome of the last beat of the vector instruction and the second vector instruction could depend on the scalar result in all of its beats, so it may be safer to avoid overlapping vector instructions with scalar instructions.

Such overlapped execution could also be used for the complex multiply instructions of the type discussed above. Hence, the respective beats of processing for the complex multiply instruction may take place all in parallel, or sequentially over a number of architectural ticks, with overlap with other instructions.

However, if overlapped execution is permitted, it can be useful for the instruction set architecture to specify that programmers should not specify the same vector register as both a destination register and one of the operand registers for the complex multiply instruction (e.g. VMMLSD Q0, Q0, Q1 instead of VMMLSD Q0, Q1, Q2). In a 1 beat/tick implementation where the data element size is equal to the beat size of greater, then specifying the same register Q0 as both source and destination can risk uncertain results since it may result in a given element of the common source/destination register Q0 being overwritten in one beat before the source value required in the following beat has yet been read from the source/destination register. This would not be a problem in the 2 or 4 beats/tick implementations, or if the data element size is smaller than the beat size for the 1 beat/tick implementation, because in this case the real/imaginary parts in adjacent elements of the vector would be read in parallel. However, the programmer writing the code to be executed may not know what particular microarchitecture implementation has been used for a given system, and so there is a risk it could be executed on a 1 beat/tick implementation.

One solution could be for the 1 beat/tick implementations to add some additional circuitry to detect cases where the destination register is the same as one of the source registers, and if so to either trigger an error or remap the registers referenced by the instructions, for example by temporarily copying one of the inputs to a different register. However, in practice the overhead of such additional circuitry is unlikely to be justified. In practice, the complex multiply instructions will often be used in a pair of first/second form instructions using the same input and destination registers as shown above, and so it is very unlikely that the programmer will choose to specify a destination register which is the same as one of the source registers, because this would cause the first instruction of the pair to overwrite the input operands required for the second. Hence, in practice the programmer is unlikely to specify the same register as both source/destination for these types of instructions, and so the overhead of adding special circuitry to guard against this may not be justified. Instead, the instruction set architecture can simply specify that results cannot be guaranteed to be correct if the programmer does use the same register as both a source and destination for these complex multiply instructions. This can provide a more area and power efficient hardware implementation by avoiding incurring expense for dealing with very rare cases.

FIG. 17 is a flow diagram showing a method of executing a complex multiply instruction. At step 50, the next instruction to be executed is fetched for decoding and the instruction decoder determines the type of the instruction. If the instruction is not a complex multiply instruction, then the instruction decoder controls the processing circuitry to perform the operation appropriate to that type of instruction. When a complex multiply instruction is encountered, then at step 52 the instruction decoder determines whether the instruction is of the first form or the second form. Also, at step 54, the instruction decoder determines whether the instruction is of the first version or the second version. If the instruction is of the first form and the first version then at step 56 the target element is at least one real element of the destination, while if the instruction is of the first form and the second version then at step 58 the target element is at least one imaginary element. Also, for the first form of the instruction, at step 60 the instruction decoder generates control information for controlling the processing circuitry 4 to generate the first product corresponding to a product of a real element of vector Q1 and a real element of vector Q2, and the second product corresponding to a product of an imaginary element of Q1 and a corresponding imaginary element of Q2.

On the other hand, if the instruction was of the second form then at step 62 again the instruction decoder determines whether the instruction was of the first or second version. If the instruction is of the first version, then at step 64 the target element is determined to be at least one imaginary element, while if the instruction is of the second version then at step 66 the target is determined to be at least one real element. At step 68, the instruction decoder 6 generates control signals for controlling the processing circuitry 4 to generate a first product corresponding to a product of a real element of Q1 and an imaginary element of Q2, and the second product as the product of the an imaginary element of Q1 and a real element of Q2.

The instruction is issued for execution, and the products defined in steps 60, 68 are generated for each pair of real/imaginary elements of the input vectors Q1, Q2, and at step 70, the corresponding first and second products are added or subtracted (depending on whether the instruction is an add-variant or subtract-variant). At step 72, a value depending on the result of the addition or subtraction is written to each target element that is not masked by predication. A rounding and truncation of the result of addition/subtraction is performed if necessary to reduce the number of bits to the data element size of the destination vector. At step 74, the processing circuitry supresses updating of at least one non-target element which was not targeted by that instruction, irrespective of whether any predication was specified for that element.

It will be appreciated that the choice of Q1 and Q2 for the source vector registers is arbitrary and which registers are used may be hardwired by the architecture. Alternatively in other embodiments the complex multiply instruction may contain parameters that indicate which registers contain the source vector values. Similarly the destination register Q0 may be hardwired or may be selected by a parameter of the complex multiply instruction.

FIG. 18 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 150 running a host operating system 140 supporting a virtual machine program 130. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 130 provides a virtual hardware interface to an guest program 120 which is the same as the hardware interface which would be provided by the real hardware which is the device being modelled by the virtual machine program 130. Thus, the program instructions, including the control of memory accesses described above, may be executed from within the guest program 120 using the virtual machine program 130 to model their interaction with the virtual machine hardware. The guest program 120 may be a bare metal program, or alternatively it may be a guest operating system that runs applications in a similar way to how Host OS 140 runs the virtual machine application 130. It will also be appreciated that there are different types virtual machine, and in some types the virtual machine runs directly on the host hardware 150 without the need for a host OS 140.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
processing circuitry to perform data processing; and
an instruction decoder to decode instructions to control the processing circuitry to perform the data processing;
wherein the instruction decoder is configured to decode a complex multiply instruction to control the processing circuitry to perform a partial complex multiply operation on first and second operand vectors to set at least one target element of a destination vector to a value dependent on a result of adding or subtracting a first product and a second product, the first and second operand vectors and the destination vector each comprising a plurality of data elements including at least one real element for representing a real part of a complex number and at least one imaginary element for representing an imaginary part of a complex number;
in response to a first form of the complex multiply instruction, the instruction decoder is configured to control the processing circuitry to perform the partial complex multiply operation with the first product comprising a product of a real element of the first operand vector and a corresponding real element of the second operand vector, and the second product comprising a product of an imaginary element of the first operand vector and a corresponding imaginary element of the second operand vector;
in response to a second form of the complex multiply instruction, the instruction decoder is configured to control the processing circuitry to perform the partial complex multiply operation with the first product comprising a product of a real element of the first operand vector and an imaginary element of the second operand vector, and the second product comprising a product of an imaginary element of the first operand vector and a real element of the second operand vector;
in response to one of the first and second forms of the complex multiply instruction, the instruction decoder is configured to control the processing circuitry to perform the partial complex multiply operation with said at least one target element comprising at least one real element of the destination vector;
in response to the other of the first and second forms of the complex multiply instruction, the instruction decoder is configured to control the processing circuitry to perform the partial complex multiply operation with said at least one target element comprising at least one imaginary element of the destination vector; and
in response to at least one of the first and second forms of the complex multiply instruction, the instruction decoder is configured to control the processing circuitry to suppress updating of at least one element of the destination vector other than said at least one target element.

2. The data processing apparatus according to claim 1, wherein in response to a complex multiply instruction for which the first and second operand vectors comprise more than two data elements, the instruction decoder is configured to control the processing circuitry to process the first and second operand vectors each comprising a plurality of real elements interleaved with a plurality of imaginary elements.

3. The data processing apparatus according to claim 2, wherein said processing circuitry is configured to determine the number of real and imaginary elements in said first and second operand vectors in response to a parameter associated with said complex multiply instruction, and said parameter is one of:

an immediate value indicative of the number of said real elements and said imaginary elements;

an immediate value indicative of a width of said real elements and said imaginary elements;

a value indicative of a register containing a value indicative of the number of said real elements and said imaginary elements; and a value indicative of a register containing a value indicative of the width of said real elements and said imaginary elements.

4. The data processing apparatus according to claim 1, wherein the processing circuitry is configured to mask an operation associated with a given portion of the destination vector in response to a predication indication identifying said given portion as a portion to be masked.

5. The data processing apparatus according to claim 4, wherein in response to said at least one of the first and second forms of the complex multiply instruction, the instruction decoder is configured to control the processing circuitry to suppress updating of said at least one element of the destination vector other than said at least one target element, irrespective of whether said predication indication identifies that a portion of the destination vector corresponding to said at least one element is a portion to be masked.

6. The data processing apparatus according to claim 1, wherein in response to an add-variant of the complex multiply instruction, the instruction decoder is configured to control the processing circuitry to set said at least one target element to a value dependent on a result of adding the first product and the second product; and in response to a subtract-variant of the complex multiply instruction, the instruction decoder is configured to control the processing circuitry to set said at least one target element to a value dependent on a result of subtracting the first product and the second product.

7. The data processing apparatus according to claim 1, wherein in response to a first version of the complex multiply instruction, the instruction decoder is configured to control the processing circuitry to perform the partial complex multiply operation with the at least one target element comprising:

at least one real element of the destination vector when the complex multiply instruction is of the first form; and at least one imaginary element of the destination vector when the complex multiply instruction is of the second form.

8. The data processing apparatus according to claim 1, wherein in response to a second version of the complex multiply instruction, the instruction decoder is configured to control the processing circuitry to perform the partial complex multiply operation with the at least one target element comprising:

at least one imaginary element of the destination vector when the complex multiply instruction is of the first form; and at least one real element of the destination vector when the complex multiply instruction is of the second form.

9. The data processing apparatus according to claim 1, wherein in response to an element-widening variant of the complex multiply instruction, the instruction decoder is configured to control the processing circuitry to perform the partial multiply operation on the first and second operand vectors comprising J-bit data elements, to generate the destination vector comprising K-bit data elements, where K>J.

10. The data processing apparatus according to claim 9, wherein K=2J, and in response to the element-widening variant of the complex multiply instruction, the instruction decoder is configured to set each of said at least one target element of the destination vector to one of:

a most significant K bits of a K+1-bit value corresponding to a result of adding or subtracting the first product and the second product; and a least significant K bits of said K+1-bit value.

11. The data processing apparatus according to claim 1, wherein in response to an element-size-preserving variant of the complex multiply instruction, the instruction decoder is configured to control the processing circuitry to perform the partial multiply operation on the first and second operand vectors comprising J-bit data elements to generate the destination vector comprising J-bit data elements.

12. The data processing apparatus according to claim 11, wherein in response to the element-size-preserving variant of the complex multiply instruction, the instruction decoder is configured to control the processing circuitry to set each of said at least one target element of the destination vector to a J-bit value comprising a truncation of an intermediate value corresponding to a result of adding or subtracting the first product and the second product.

13. The data processing apparatus according to claim 12, wherein in response to the element-size-preserving variant of the complex multiply instruction, the instruction decoder is configured to control the processing circuitry to perform the truncation comprising selecting J bits of the intermediate value and rounding the selected J bits in dependence on at least one less significant bit of the intermediate value than the selected J bits.

14. The data processing apparatus according to claim 12, wherein the intermediate value comprises 2J+1 bits and the truncation comprises selecting a most significant J bits of the (2J+1)-bit value.

15. The data processing apparatus according to claim 12, wherein the intermediate value comprises 2J+1 bits [2J:0], and the truncation comprises selecting bits [2J−1:J] of the (2J+1)-bit value.

16. The data processing apparatus according to claim 1, wherein in response to an integer or fixed-point variant of the complex multiply instruction, the instruction decoder is configured to control the processing circuitry to perform the partial complex multiply operation to generate said at least one target element using integer or fixed-point arithmetic.

17. The data processing apparatus according to claim 1, wherein in response to a floating-point variant of the complex multiply instruction, the instruction decoder is configured to control the processing circuitry to perform the partial multiply operation to generate said at least one target element using floating-point arithmetic.

18. The data processing apparatus according to claim 1, wherein in response to a vector instruction, the processing circuitry is configured to perform a plurality of beats of processing, each beat comprising processing corresponding to a portion of a vector value; and the processing circuitry is configured to support overlapped execution of first and second vector instructions in which a first subset of beats of the second vector instruction is performed in parallel with a second subset of beats of the first vector instruction.

19. A data processing method comprising:

decoding a complex multiply instruction to control processing circuitry to perform a partial complex multiply operation on first and second operand vectors to set at least one target element of a destination vector to a value dependent on a result of adding or subtracting a first product and a second product, the first and second operand vectors and the destination vector each comprising a plurality of data elements including at least one real element for representing a real part of a complex number and at least one imaginary element for representing an imaginary part of a complex number;

wherein in response to a first form of the complex multiply instruction, the partial complex multiply operation is performed with the first product comprising a product of a real element of the first operand vector and a corresponding real element of the second operand vector, and the second product comprising a product of an imaginary element of the first operand vector and a corresponding imaginary element of the second operand vector;

in response to a second form of the complex multiply instruction, the partial complex multiply operation is performed with the first product comprising a product of a real element of the first operand vector and an imaginary element of the second operand vector, and the second product comprising a product of an imaginary element of the first operand vector and a real element of the second operand vector;

in response to one of the first and second forms of the complex multiply instruction, the partial complex multiply operation is performed with said at least one target element comprising at least one real element of the destination vector;

in response to the other of the first and second forms of the complex multiply instruction, the partial complex multiply operation is performed with said at least one target element comprising at least one imaginary element of the destination vector; and in response to at least one of the first and second forms of the complex multiply instruction, updating of at least one element of the destination vector other than said at least one target element is suppressed.

20. A non-transitory computer-readable storage medium storing a virtual machine computer program comprising program instructions to control a host data processing apparatus to provide an instruction execution environment corresponding to the apparatus according to claim 1.

* * * * *